(12) United States Patent
Itogawa et al.

(10) Patent No.: US 12,170,487 B2
(45) Date of Patent: Dec. 17, 2024

(54) INSULATING TRANSFORMER AND POWER CONVERSION DEVICE EQUIPPED WITH SAME

(71) Applicant: Mitsubishi Electric Corporation, Tokyo (JP)

(72) Inventors: Yuki Itogawa, Tokyo (JP); Kikuo Izumi, Tokyo (JP); Takeshi Amimoto, Tokyo (JP); Yu Kawai, Tokyo (JP); Tomoaki Kimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 240 days.

(21) Appl. No.: 17/766,534

(22) PCT Filed: Dec. 5, 2019

(86) PCT No.: PCT/JP2019/047679
§ 371 (c)(1),
(2) Date: Apr. 5, 2022

(87) PCT Pub. No.: WO2021/111601
PCT Pub. Date: Jun. 10, 2021

(65) Prior Publication Data
US 2023/0208304 A1    Jun. 29, 2023

(51) Int. Cl.
*H02M 3/335*    (2006.01)
*H01F 38/08*    (2006.01)
(Continued)

(52) U.S. Cl.
CPC ........ *H02M 3/33584* (2013.01); *H01F 38/08* (2013.01); *H02M 1/44* (2013.01); *H01F 2038/006* (2013.01)

(58) Field of Classification Search
CPC ..... H02M 3/33584; H02M 1/44; H01F 38/08; H01F 2038/006; H01F 38/00
See application file for complete search history.

(56) References Cited

U.S. PATENT DOCUMENTS 2,428,586 A * 10/1947 Rose ................. H02M 1/02
                                                          315/195
3,210,648 A * 10/1965 Lockie ............. H01F 27/2847
                                                          336/183
(Continued)

FOREIGN PATENT DOCUMENTS

JP       3-65053 A      3/1991
JP       5-268767 A    10/1993
(Continued)

OTHER PUBLICATIONS

International Search Report and Written Opinion mailed on Feb. 25, 2020, received for PCT Application PCT/JP2019/047679, Filed on Dec. 5, 2019, 8 pages including English Translation.
(Continued)

*Primary Examiner* — Yusef A Ahmed
(74) *Attorney, Agent, or Firm* — XSENSUS LLP

(57) ABSTRACT

An insulating transformer includes a plurality of sub-insulating transformers connected in series. Polarity directions of all sub-windings are identical. When a current I flows from a first main terminal to a third main terminal through the first sub-winding, an interphase capacitance, and the second sub-winding, excitation inductance of the first sub-winding and excitation inductance of the second sub-winding are configured to have opposite polarities.

2 Claims, 14 Drawing Sheets

(51) Int. Cl.
*H02M 1/44* (2007.01)
*H01F 38/00* (2006.01)

(56) References Cited

U.S. PATENT DOCUMENTS

| | | | | | |
|---|---|---|---|---|---|
| 3,210,704 | A | * | 10/1965 | Book | H01F 27/2847 336/183 |
| 3,745,440 | A | * | 7/1973 | Lord | H01F 38/06 363/17 |
| 4,912,372 | A | * | 3/1990 | Mongoven | H05B 47/23 307/17 |
| 5,422,765 | A | * | 6/1995 | Kobayashi | H02M 1/12 363/40 |
| 5,598,327 | A | * | 1/1997 | Somerville | H02J 7/02 336/200 |
| 5,754,413 | A | * | 5/1998 | Fraidlin | H02M 3/33571 363/16 |
| 5,973,937 | A | * | 10/1999 | Yasumura | H02M 1/4241 363/19 |
| 7,932,693 | B2 | * | 4/2011 | Lee | H02M 7/53875 318/727 |
| 11,121,633 | B2 | * | 9/2021 | Sigamani | H02M 1/08 |
| 11,777,487 | B1 | * | 10/2023 | Sabate | H02M 1/08 327/108 |
| 2003/0206391 | A1 | * | 11/2003 | Princinsky | H02H 9/04 361/600 |
| 2005/0093472 | A1 | * | 5/2005 | Jin | H01F 38/00 315/246 |
| 2005/0145611 | A1 | * | 7/2005 | Blankenship | H05H 1/36 219/130.1 |
| 2009/0309425 | A1 | * | 12/2009 | Princinsky | H02J 3/01 307/105 |
| 2013/0301306 | A1 | * | 11/2013 | Hosotani | H02M 3/33507 363/21.02 |
| 2013/0301308 | A1 | * | 11/2013 | Hosotani | H02M 3/3381 363/21.03 |
| 2014/0169048 | A1 | * | 6/2014 | Inoue | H02M 1/08 363/64 |
| 2016/0254756 | A1 | * | 9/2016 | Yang | H01F 27/2823 363/21.02 |
| 2018/0330868 | A1 | * | 11/2018 | Volfson | H01F 27/2804 |
| 2019/0068060 | A1 | * | 2/2019 | Kim | H02M 3/33576 |
| 2019/0288606 | A1 | | 9/2019 | Higaki et al. | |
| 2019/0348213 | A1 | * | 11/2019 | Ikarashi | H01F 27/2804 |
| 2020/0044571 | A1 | * | 2/2020 | Bouchez | H02M 3/33584 |
| 2020/0177073 | A1 | * | 6/2020 | Davidson | H02M 3/01 |
| 2020/0274443 | A1 | * | 8/2020 | Itogawa | H02M 3/33573 |
| 2022/0209685 | A1 | * | 6/2022 | Ito | H02M 7/53875 |
| 2023/0011289 | A1 | * | 1/2023 | Kim | H02M 1/4233 |

FOREIGN PATENT DOCUMENTS

| | | |
|---|---|---|
| JP | 7-23990 U | 5/1995 |
| JP | 2015-142419 A | 8/2015 |
| WO | 2018/016106 A1 | 1/2018 |

OTHER PUBLICATIONS

Extended European Search Report issued Jan. 3, 2023 in corresponding European Patent Application No. 19954762.1, 12 pages.

* cited by examiner (A)

(B)

(A)

(B)

(A)

(B)

INSULATING TRANSFORMER AND POWER CONVERSION DEVICE EQUIPPED WITH SAME

CROSS-REFERENCE TO RELATED APPLICATION

The present application is based on PCT filing PCT/JP2019/047679, filed Dec. 5, 2019, the entire contents of which is incorporated herein by reference.

TECHNICAL FIELD

The present disclosure relates to an insulating transformer and a power conversion device including the insulating transformer.

BACKGROUND ART

For example, WO 2018/016106 (PTL 1) discloses a power conversion device including an insulating transformer including first and second windings, a first power converter that converts DC power supplied from a first DC power supply into AC power to supply the AC power to the first winding, and a second power converter that converts AC power received from the second winding into DC power to supply the DC power to the second DC power supply.

CITATION LIST

Patent Literature

PTL 1: WO 2018/016106

SUMMARY OF INVENTION

Technical Problem

However, in the conventional power conversion device, because one large and heavy insulating transformer is used, there is a problem in that assemblability property and heat dissipation are poor to increase cost.

Therefore, a main object of the present disclosure is to provide a low-cost insulating transformer having the high assemblability and heat dissipation, and a power conversion device including the insulating transformer.

Solution to Problem

An insulating transformer of the present disclosure includes first to Nth sub-insulating transformers electrically connected to each other. N is an integer greater than or equal to 2. Each of the first to Nth sub-insulating transformers includes first and second sub-windings, first and second sub-terminals connected to a first polarity terminal and a second polarity terminal of the first sub-winding, respectively, and third and fourth sub-terminals connected to a first polarity terminal and a second polarity terminal of the second sub-winding, respectively. Polarity directions of the first and second sub-windings are identical. Each of the first to Nth sub-insulating transformers is configured such that an excitation inductance of the first sub-winding and an excitation inductance of the second sub-winding become opposite polarities when a current flows from the first sub-terminal to the third sub-terminal through the first sub-winding, an interphase capacitance between the first and second sub-windings, and the second sub-winding.

Advantageous Effects of Invention

The insulating transformer is divided into a plurality of sub-insulating transformers. Accordingly, an increase in volume and weight concentration can be prevented in the insulating transformer, the assemblability can be improved by enabling substrate mounting, the heat dissipation can be improved by dispersing the heat source, and the cost reduction can be implemented using a general-purpose sub-insulating transformer with a large distribution amount and easy availability.

Each of the first to Nth sub-insulating transformers is configured such that the excitation inductance of the first sub-winding and the excitation inductance of the second sub-winding become opposite polarities when the current flows from the first sub-terminal to the third sub-terminal through the first sub-winding, the interphase capacitance between the first and second sub-windings, and the second sub-winding. Accordingly, the sum of the excitation inductances of the first and second windings can be reduced, and generation of a resonance phenomenon between the excitation inductances of the first and second windings and the interphase capacitance can be prevented.

DESCRIPTION OF EMBODIMENTS

First Embodiment

Figure 1:
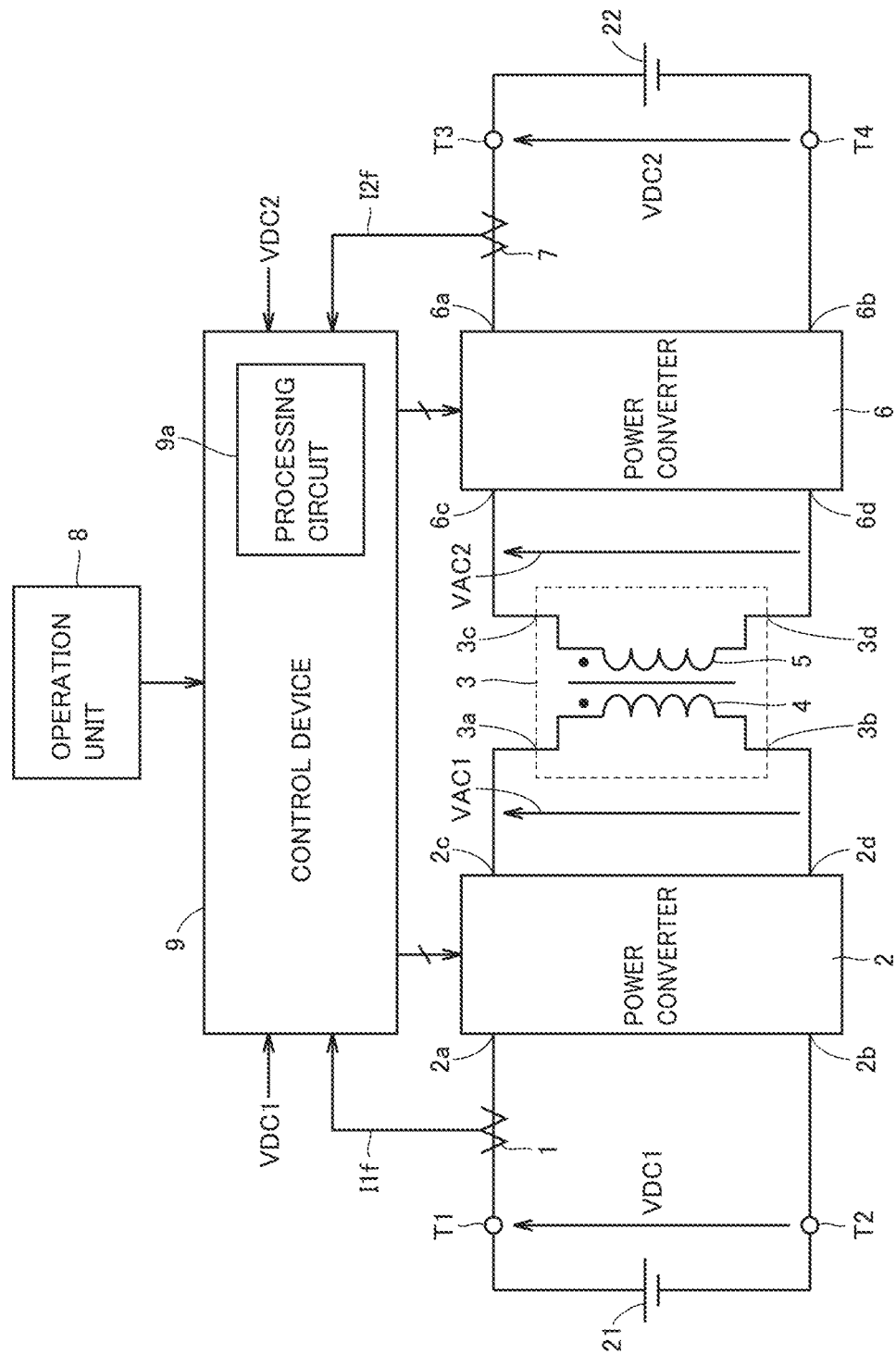
FIG. 1 is a circuit block diagram illustrating a configuration of a bidirectional DC/DC converter according to a first embodiment.

FIG. 1 is a circuit block diagram illustrating a configuration of a bidirectional DC/DC converter according to a first embodiment. In FIG. 1, the bidirectional DC/DC converter (power conversion device) is a dual active bridge (DAB) system, and includes DC terminals T1 to T4, current detectors 1, 7, power converters 2, 6, an insulating transformer 3, an operation unit 8, and a control device 9.

DC terminals T1, T2 are connected to positive and negative electrodes of a DC power supply 21 (first DC power supply), respectively. DC terminals T3, T4 are connected to positive and negative electrodes of a DC power supply 22 (second DC power supply), respectively. Each of a DC voltage VDC1 between DC terminals T1, T2 and a DC voltage VDC2 between DC terminals T3, T4 is detected by control device 9.

For example, one of DC power supplies 21, 22 is a solar cell that outputs DC power, and the other is a battery (or capacitor) that stores the DC power. Both of DC power supplies 21, 22 may be a battery (or capacitor). A load driven by the DC power may be connected in parallel to at least one of DC power supplies 21, 22.

Insulating transformer 3 includes first and second main windings 4, 5 and first to fourth main terminals 3a to 3d. A black circle (•) is marked on a positive polarity side of each of first and second main windings 4, 5. A positive electrode terminal (first polarity terminal) and a negative electrode terminal (second polarity terminal) of first main winding 4 are connected to first and second main terminals 3a, 3b, respectively. The positive electrode terminal and the negative electrode terminal of second main winding 5 are connected to third and fourth main terminals 3c, 3d, respectively.

Assuming that a direction from the negative electrode terminal (terminal on a negative polarity side) of the winding toward the positive electrode terminal (terminal on the negative polarity side) of the winding is a polarity direction of the winding, the polarity directions of first and second main windings 4, 5 are the same. FIG. 1 illustrates a case where the polarity directions of first and second main windings 4, 5 are both an upward direction. Numbers of turns of first and second main windings 4, 5 are the same.

When an AC voltage VAC1 is applied between first and second main terminals 3a, 3b, an AC voltage VAC2 appears between third and fourth main terminals 3c, 3d. Conversely, when an AC voltage VAC2 is provided between third and fourth main terminals 3c, 3d, AC voltage VAC1 appears between first and second main terminals 3a, 3b. AC voltages VAC1, VAC2 have the same polarity (that is, the same phase) and the same amplitude.

Power converter 2 (first power converter) includes DC terminals 2a, 2b respectively connected to DC terminals T1, T2, and AC terminals 2c, 2d respectively connected to first and second main terminals 3a, 3b of insulating transformer 3, and is controlled by control device 9.

In a first transmission mode in which the DC power is supplied from DC power supply 21 to DC power supply 22, power converter 2 converts DC voltage VDC1 applied from DC power supply 21 to DC terminals 2a, 2b into AC voltage VAC1 and outputs AC voltage VAC1 between AC terminals 2c, 2d.

In a second transmission mode in which the DC power is supplied from DC power supply 22 to DC power supply 21, power converter 2 converts AC voltage VAC1 applied between AC terminals 2c, 2d into DC voltage VDC1 and outputs DC voltage VDC1 between DC terminals 2a, 2b.

Power converter 6 (second power converter) includes DC terminals 6a, 6b connected to DC terminals T3, T4, and AC terminals 6c, 6d connected to third and fourth main terminals 3c, 3d of insulating transformer 3, and is controlled by control device 9.

In the first transmission mode, power converter 6 converts AC voltage VAC2 provided between AC terminals 6c, 6d into DC voltage VDC2 and outputs DC voltage VDC2 between DC terminals 6a, 6b. In the second transmission mode, power converter 6 converts DC voltage VDC2 applied from DC power supply 22 to DC terminals 6a, 6b into AC voltage VAC2 and outputs AC voltage VAC2 between AC terminals 6c, 6d.

Current detector 1 detects a current I1 flowing between DC terminal T1 and DC terminal 2a of power converter 2, and outputs a signal I1f indicating a detected value of current I1 to control device 9. Current detector 7 detects a current I2 flowing between DC terminal T3 and DC terminal 6a of power converter 6, and outputs a signal I2f indicating a detected value of current I2 to control device 9.

Operation unit 8 includes a plurality of buttons and a plurality of switches operated by a user of the bidirectional DC/DC converter and an image display unit that displays various pieces of information. By operating operation unit 8, the user can turn on and off the power of the bidirectional DC/DC converter and select one of the first and second transmission modes. Operation unit 8 outputs a signal indicating the selected transmission mode or the like to control device 9.

Control device 9 controls the entire bidirectional DC/DC converter based on DC voltages VDC1, VDC2, DC currents I1, I2 indicated by the output signals of current detectors 1, 7, the signal from operation unit 8, and the like.

In the first transmission triode, control device 9 controls each of power converters 2, 6 such that DC current I2 becomes a predetermined reference current I2R (or DC voltage VDC2 becomes a predetermined reference voltage VDC2R).

In the second transmission mode, control device 9 controls each of power converters 2, 6 such that DC current I1 becomes a predetermined reference current I1R (or DC voltage VDC1 becomes a predetermined reference voltage VDC1R).

Control device 9 includes a processing circuit 9a. Processing circuit 9a may be configured by a digital electronic circuit such as an arithmetic processing device and a storage device, configured by an analog electronic circuit such as a comparator, an operational amplifier, and a differential amplifier circuit, or configured by both the digital electronic circuit and the analog electronic circuit.

Figure 2:
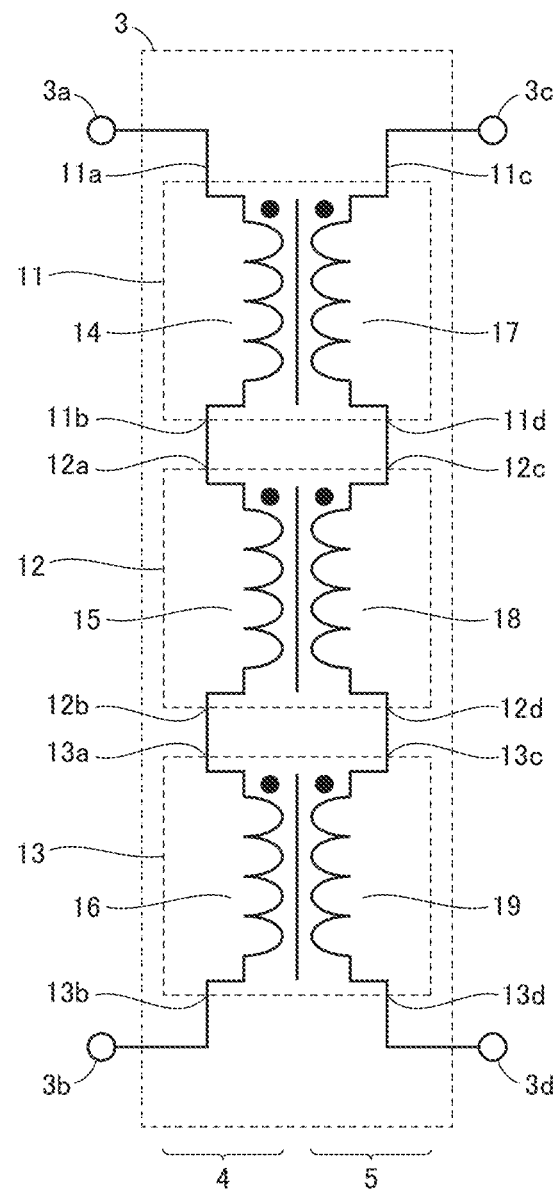
FIG. 2 is a circuit diagram illustrating a configuration of an insulating transformer in FIG. 1.

FIG. 2 is a circuit diagram illustrating a configuration of insulating transformer 3. In FIG. 2, insulating transformer 3 includes a plurality of sub-insulating transformers 11 to 13. Sub-insulating transformers 11 to 13 configure first to Nth sub-insulating transformers. N is an integer greater than or equal to 2. FIG. 2 illustrates the case of N=3.

First sub-insulating transformer 11 includes an iron core (not illustrated), first and second sub-windings 14, 17 wound around the iron core, and first to fourth sub-terminals 11a to 11d. A black circle (•) is marked on the positive polarity side of each of first and second sub-windings 14, 17. The positive electrode terminal and the negative electrode terminal of first sub-winding 14 are connected to first and second sub-terminals 11a, 11b, respectively. The positive electrode terminal and the negative electrode terminal of second sub-winding 17 are connected to third and fourth sub-terminals 11c, 11d, respectively.

The polarity directions of first and second sub-windings 14, 17 are the same. FIG. 2 illustrates the case where the polarity directions of first and second sub-windings 14, 17 are both the upward direction. The numbers of turns of first and second sub-windings 14, 17 are the same.

Second sub-insulating transformer 12 includes an iron core (not illustrated), first and second sub-windings 15, 18 wound around the iron core, and first to fourth sub-terminals 12a to 12d. A black circle (•) is marked on the positive polarity side of each of first and second sub-windings 15, 18. The positive electrode terminal and the negative electrode terminal of first sub-winding 15 are connected to first and second sub-terminals 12a, 12b, respectively. The positive electrode terminal and the negative electrode terminal of second sub-winding 18 are connected to third and fourth sub-terminals 12c, 12d, respectively.

The polarity directions of first and second sub-windings 15, 18 are the same. FIG. 2 illustrates the case where the polarity directions of first and second sub-windings 15, 18 are both the upward direction. The numbers of turns of first and second sub-windings 15, 18 are the same.

Third sub-insulating transformer 13 includes an iron core (not illustrated), first and second sub-windings 16, 19 wound around the iron core, and first to fourth sub-terminals 13a to 13d. A black circle (•) is marked on the positive polarity side of each of first and second sub-windings 16, 19. The positive electrode terminal and the negative electrode terminal of first sub-winding 16 are connected to first and second sub-terminals 13a, 13b, respectively. The positive electrode terminal and the negative electrode terminal of second sub-winding 19 are connected to third and fourth sub-terminals 13c, 13d, respectively.

The polarity directions of first and second sub-windings 16, 19 are the same. FIG. 2 illustrates the case where the polarity directions of first and second sub-windings 16, 19 are both the upward direction. The numbers of turns of first and second sub-windings 16, 19 are the same.

The polarities of three first sub-windings 14 to 16 are oriented in the same direction. Three first sub-windings 14 to 16 are connected in series between first and second main terminals 3a, 3b of insulating transformer 3 to configure first main winding 4. That is, first sub-terminal 11a of first sub-insulating transformer 11 is connected to first main terminal 3a of insulating transformer 3. Second sub-terminal 11b of first sub-insulating transformer 11 is connected to first sub-terminal 12a of second sub-insulating transformer 12. Second sub-terminal 12b of second sub-insulating transformer 12 is connected to first sub-terminal 13a of third sub-insulating transformer 13. Second sub-terminal 13b of third sub-insulating transformer 13 is connected to second main terminal 3b of insulating transformer 3.

The polarities of three second sub-windings 17 to 19 are oriented in the same direction. Three second sub-windings 17 to 19 are connected in series between third and fourth main terminals 3c, 3d of insulating transformer 3 to configure second main winding 5. That is, third sub-terminal 11c of first sub-insulating transformer 11 is connected to third main terminal 3c of insulating transformer 3. Fourth sub-terminal 11d of first sub-insulating transformer 11 is connected to third sub-terminal 12c of second sub-insulating transformer 12. Fourth sub-terminal 12d of second sub-insulating transformer 12 is connected to third sub-terminal 13c of third sub-insulating transformer 13. Fourth sub-terminal 13d of third sub-insulating transformer 13 is connected to fourth main terminal 3d of insulating transformer 3.

The polarities of three second sub-windings 17 to 19 are oriented in the same direction. Three second sub-windings 17 to 19 are connected in series between third and fourth main terminals 3c, 3d of insulating transformer 3 to configure second main winding 5. That is, third sub-terminal 11c of first sub-insulating transformer 11 is connected to third main terminal 3c of insulating transformer 3. Fourth sub-terminal 11d of first sub-insulating transformer 11 is connected to third sub-terminal 12c of second sub-insulating transformer 12. Fourth sub-terminal 12d of second sub-insulating transformer 12 is connected to third sub-terminal 13c of third sub-insulating transformer 13. Fourth sub-terminal 13d of third sub-insulating transformer 13 is connected to fourth main terminal 3d of main insulating transformer 3.

When AC voltage VAC1 is applied between first main terminal 3a and second main terminal 3b, AC voltage VAC2 appears between third main terminal 3c and fourth main terminal 3d. When AC voltage VAC2 is applied between third main terminal 3c and fourth main terminal 3d, AC voltage VAC1 appears between first main terminal 3a and second main terminal 3b. Because the number of turns of first main winding 4 and the number of turns of second main winding 5 are the same, the amplitude of AC voltage VAC1 and the amplitude of AC voltage VAC2 are the same. Because the polarity of first main winding 4 and the polarity of second main winding 5 are the same, AC voltages VAC1, VAC2 have the same polarity, and the phase of AC voltage VAC1 and the phase of AC voltage VAC2 are the same.

As described above, because the plurality of sub-insulating transformers 11 to 13 are connected in series to configure one insulating transformer 3, an increase in volume and weight concentration can be prevented to enable substrate mounting to improve assemblability, heat dissipation can be improved by dispersing a heat source, and cost reduction can be improved using a general-purpose core having a large distribution amount and high availability. In addition, because the polarity directions of sub-windings 14 to 19 are aligned in the same direction, generation of a resonance phenomenon can be prevented in the bidirectional DC/DC converter. The reason why the resonance phenomenon can be prevented will be described later.

Figure 3:
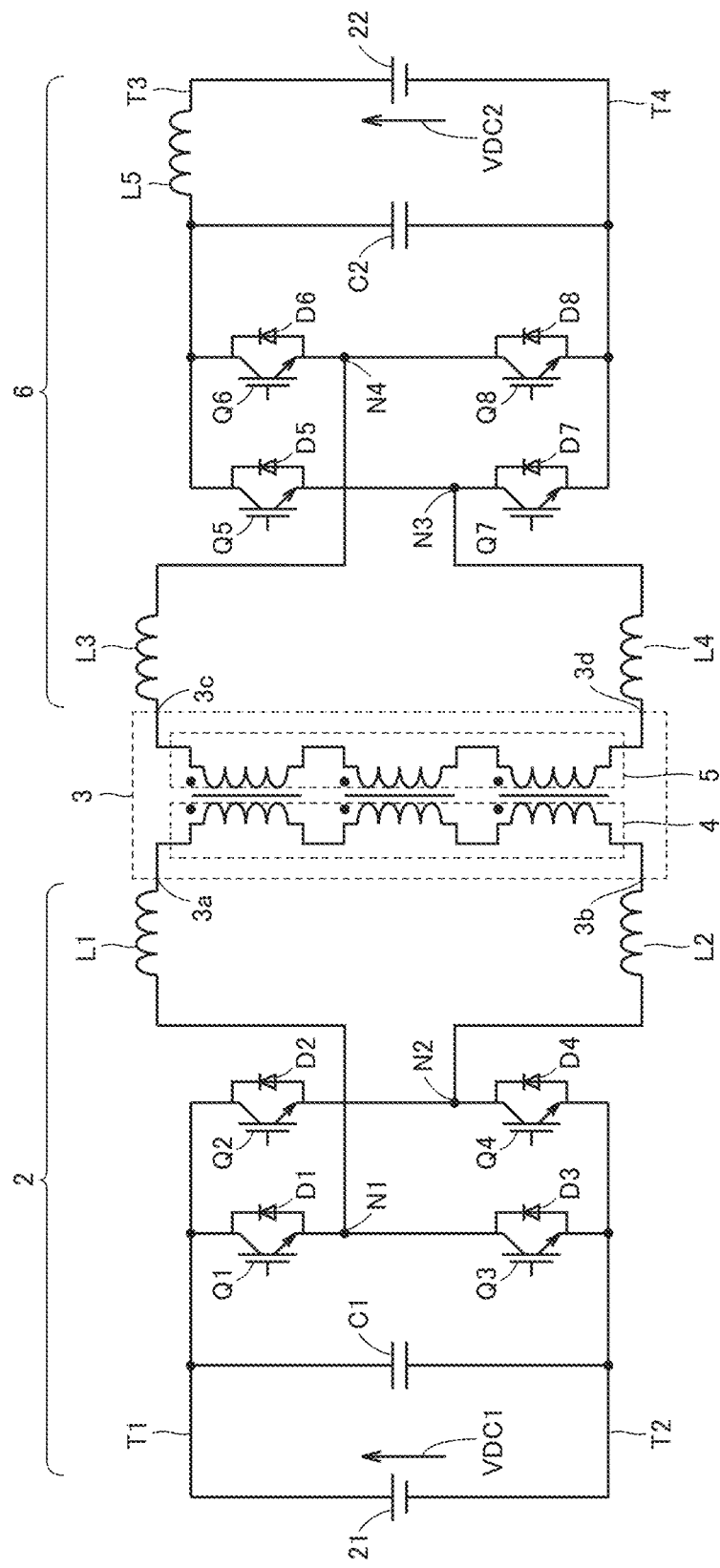
FIG. 3 is a circuit diagram illustrating a configuration of a power converter in FIG. 1.

FIG. 3 is a circuit diagram illustrating a configuration of power converters 2, 6. In FIG. 3, power converter 2 includes a capacitor C1, insulated gate bipolar transistors (IGBTs) Q1 to Q4, diodes D1 to D4, and reactors L1, L2. Capacitor C1 is connected between DC terminals T1, T2, and smooths and stabilizes DC voltage VDC1 between DC terminals T1, T2.

Collectors of the IGBTs Q1, Q2 are connected to DC terminal T1, and emitters of IGBTs Q1, Q2 are connected to nodes N1, N2 (first and second AC terminals). Collectors of IGBTs Q3, Q4 are connected to nodes N1, N2, and emitters of IGBTs Q3, Q4 are connected to DC terminal T2. Each of IGBTs Q1 to Q4 is turned on and off by control device 9.

Reactor L1 is connected between node N1 and first main terminal 3a of insulating transformer 3. Reactor L2 is connected between node N2 and second main terminal 3b of insulating transformer 3. Each of reactors L1, L2 stores electromagnetic energy.

Power converter 6 includes reactors L3 to L5, IGBTs Q5 to Q8, diodes D5 to D8, and a capacitor C2. Reactor L3 is connected between third main terminal 3c of insulating transformer 3 and a node N4. Reactor L4 is connected between fourth main terminal 3d of insulating transformer 3 and a node N3. Each of reactors L3, L4 stores electromagnetic energy.

Collectors of IGBTs Q5, Q6 are connected to each other, and emitters of IGBTs Q5, Q6 are connected to nodes N3, N4. Collectors of IGBTs Q7, Q8 are connected to nodes N3, N4, and emitters of IGBTs Q7, Q8 are connected to DC terminal T4. Each of IGBTs Q5 to Q8 is turned on and off by control device 9.

Capacitor C2 is connected between the collectors of IGBTs Q5, Q6 and DC terminal T4. Reactor L5 is connected between the collectors of IGBTs Q5, Q6 and DC terminal T3. Capacitor C2 and reactor L5 configure a low-pass filter.

A metal oxide semiconductor field effect transistor (MOSFET) may be used instead of the IGBT. In addition, a capacitor may be connected in parallel to the IGBT as a zero voltage switching circuit that makes the voltage between the collector and the emitter of the IGBT during switching substantially zero.

Figure 4:
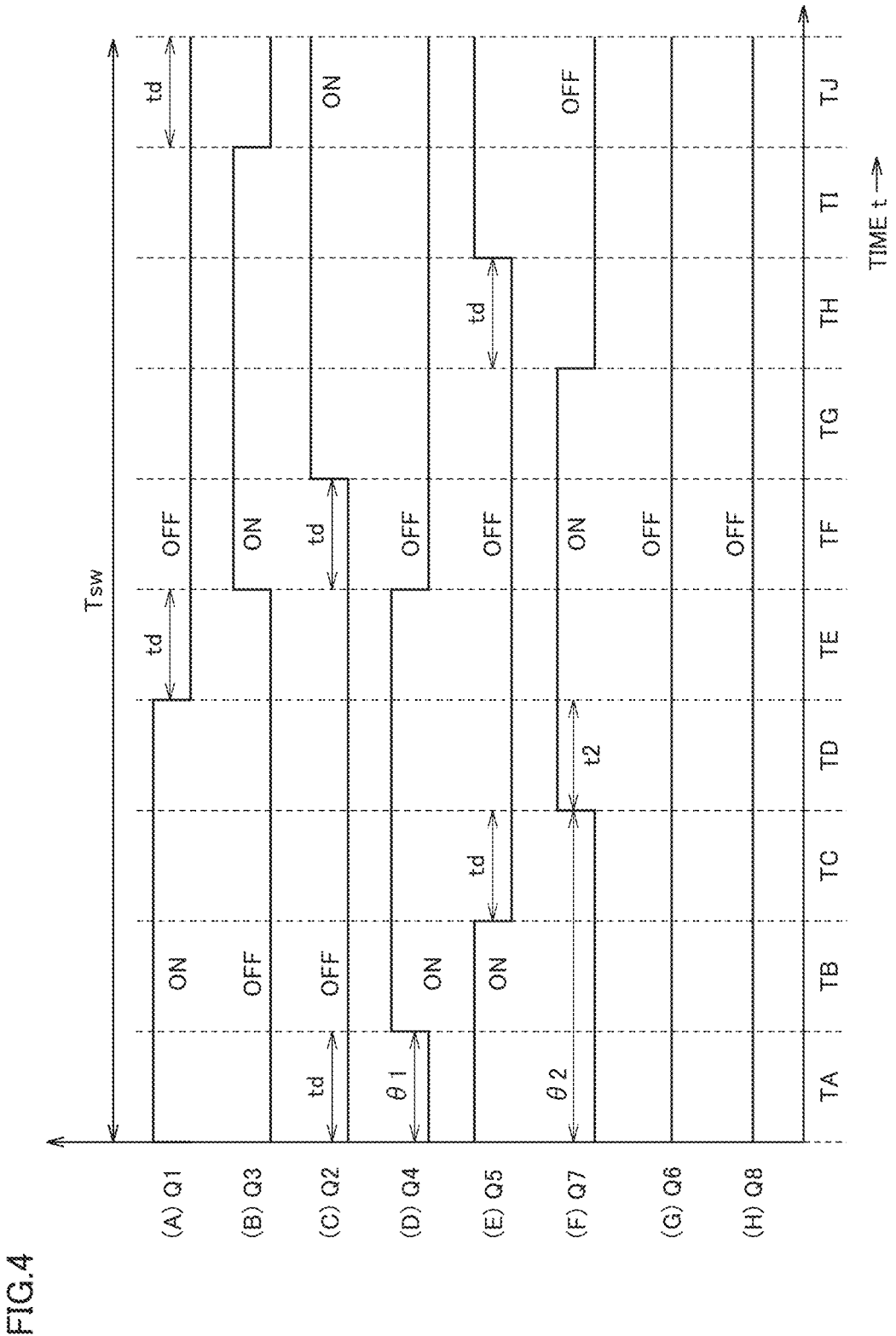
FIG. 4 is a time chart illustrating operation of the bidirectional DC/DC converter in FIGS. 1 to 3.

FIG. 4 is a time chart illustrating the operation of the bidirectional DC/DC converter in FIGS. 1 to 3. FIG. 4 illustrates the operation in the first transmission mode in which DC power is transmitted from DC power supply 21 to DC power supply 22. DC power supply 22 is a battery.

FIGS. 4(A) to 4(H) indicate on and off operations of IGBTs Q1, Q3, Q2, Q4, Q5, Q7, Q6, Q8, respectively. A switching period Tsw of IGBT Q1 is divided into 10 periods TA to TJ.

In the first transmission mode, control device 9 alternately turns on IGBT Q1, Q3, IGBTs Q4, Q2, and IGBTs Q5, Q7 within switching period Tsw with a short-circuit prevention time td interposed therebetween, and fixes IGBTs Q6, Q8 to an off state.

A period from turn-off of IGBT Q2 to turn-on of IGBT Q4 is defined as a first phase shift amount θ1, and a period from turn-off of IGBT Q2 to turn-on of IGBT Q7 is defined as a second phase shift amount θ2. Control device 9 adjusts first phase shift amount θ1 and second phase shift amount θ2 based on a transmission power amount.

When output voltage VDC1 of DC power supply 21 is boosted to charge DC power supply 22 (battery) (VDC2>VDC1), second phase shift amount θ2 is set to a value larger than first phase shift amount θ1. When output voltage VDC1 of DC power supply 21 is stepped down to charge DC power supply 22 (battery) (VDC2<VDC1), second phase shift amount θ2 is set to the same value as first phase shift amount θ1.

For example, in a period TB, IGBTs Q1, Q4 are turned on, the current flows from the positive electrode of DC power supply 21 to the negative electrode of DC power supply 21 through IGBT Q1, reactor L1, first main winding 4, reactor L2, and IGBT Q4, and the electromagnetic energy is stored in reactors L1, L2. In addition, IGBT Q5 is turned on, the current flows from third main terminal 3c of insulating transformer 3 to third terminal 3c through reactor L3, diode D6, IGBT Q5, reactor L4, and second main winding 5, and the electromagnetic energy is stored in reactors L3, L4.

Subsequently, in a period TC, IGBTs Q1, Q4 are maintained in an on state, the current flows in the same path as in period TB, and the electromagnetic energy is stored in reactors L1, L2. In addition, IGBT Q5 is turned off, the current flows from third terminal 3c of insulating transformer 3 to third terminal 3c through reactor L3, diode D6, reactor L5, DC power supply 22 (battery), diode D7, reactor L4, and second main winding 5 of insulating transformer 3, and the electromagnetic energy of reactors L3, L4 is released.

At this point, the voltage obtained by adding an inter-terminal voltage of second main winding 5 of insulating transformer 3, an inter-terminal voltage of reactor L3, and an inter-terminal voltage of reactor L4 is applied between the terminals of DC power supply 22 (battery). Accordingly, in the first transmission mode of FIG. 4, second DC power supply 22 (battery) is charged to the voltage higher than output voltage VDC1 of first DC power supply 21 (VDC2>VDC1).

In the second transmission mode in which the DC power is transmitted from DC power supply 22 to DC power supply 21, control device 9 alternately turns on IGBTs Q6, Q8, IGBTs Q7, Q5, and IGBTs Q2, Q4 with a short-circuit prevention time td interposed therebetween, and fixes IGBTs Q1, Q3 to the off state. In the second transmission mode, because the reverse operation of the first transmission mode is performed, the description thereof is not repeated.

As described above, the plurality of sub-insulating transformers 11 to 13 are connected in series to configure one insulating transformer 3, so that the assemblability, the heat dissipation, and the cost reduction can be improved to achieve the high performance of the product.

In addition, the inventors of the present application have recognized the problem that is not generally known when the plurality of sub-insulating transformers 11 to 13 are connected in series to configure one insulating transformer 3, and further have found means for solving the problem. Hereinafter, this point will be described in detail with reference to the drawings.

Figure 5:
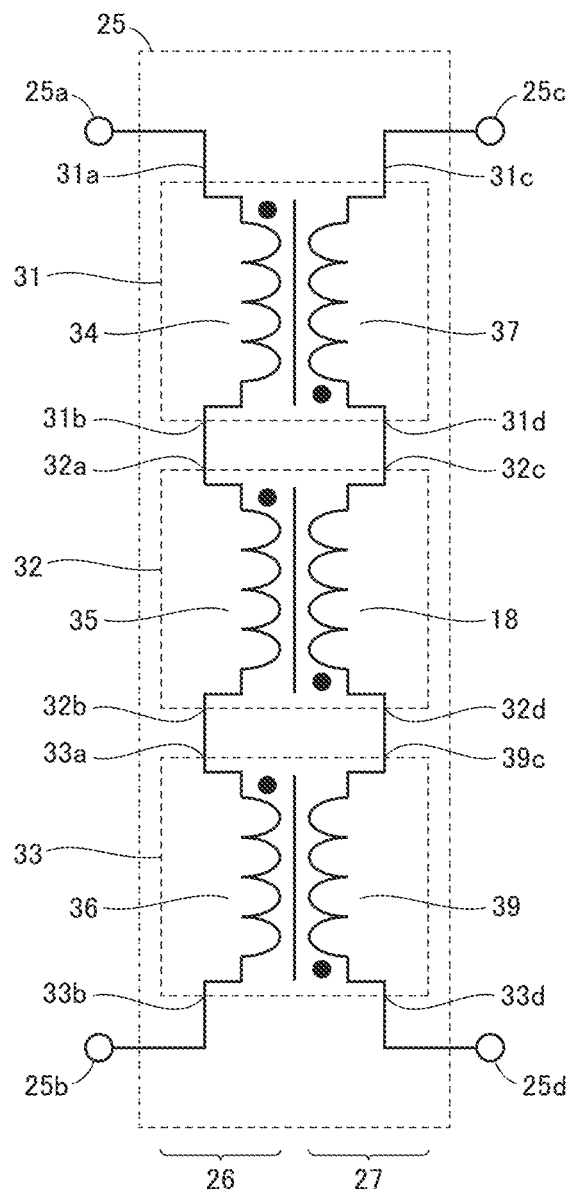
FIG. 5 is a circuit diagram illustrating a main part according to a comparative example of the first embodiment.

FIG. 5 is a circuit diagram illustrating a main part of a comparative example of the first embodiment, and is a view compared with FIG. 2. In FIG. 5, in the comparative example, an insulating transformer 25 is used. Insulating transformer 25 includes first to fourth main terminals 25a to 25d and a plurality of sub-insulating transformers 31 to 33. The plurality of sub-insulating transformers 31 to 33 are connected in series between first and third main terminals 25a, 25c and second and fourth main terminals 25b, 25d.

That is, first sub-insulating transformer 31 includes an iron core (not illustrated), first and second sub-windings 34, 37 wound around the iron core, and first to fourth sub-terminals 31a to 31d. A black circle (•) is marked on the positive polarity side of each of first and second sub-windings 34, 37. The positive electrode terminal and the negative electrode terminal of first sub-winding 34 are connected to first and second sub-terminals 31a, 31b, respectively. The positive electrode terminal and the negative electrode terminal of second sub-winding 37 are connected to fourth and third sub-terminals 31d and 31c, respectively.

The polarity directions of first and second sub-windings 34, 37 are reverse. FIG. 5 illustrates the case where the polarity directions of first and second sub-windings 34, 37 are the upward direction and the downward direction, respectively. The numbers of turns of first and second sub-windings 34, 37 are the same.

Second sub-insulating transformer 32 includes an iron core (not illustrated), first and second sub-windings 35, 38 wound around the iron core, and first to fourth sub-terminals 32a to 32d. A black circle (•) is marked on the positive polarity side of first and second sub-windings 35, 38. The positive electrode terminal and the negative electrode terminal of first sub-winding 35 are connected to first and second sub-terminals 32a, 32b, respectively. The positive electrode terminal and the negative electrode terminal of second sub-winding 38 are connected to fourth and third sub-terminals 32d, 32c, respectively.

The polarity directions of first and second sub-windings 35, 38 are reverse. FIG. 5 illustrates the case where the polarity directions of the first and second sub-windings 35, 38 are the upward direction and the downward direction, respectively. The numbers of turns of first and second sub-windings 35, 38 are the same.

Third sub-insulating transformer 33 includes an iron core (not illustrated), first and second sub-windings 36, 39 wound around the iron core, and first to fourth sub-terminals 33a to 33d. A black circle (•) is marked on the positive polarity side of each of first and second sub-windings 36, 39. The positive electrode terminal and the negative electrode terminal of first sub-winding 36 are connected to first and second sub-terminals 33a, 33b, respectively. The positive electrode terminal and the negative electrode terminal of second sub-winding 39 are connected to fourth and third sub-terminals 33d, 33c, respectively.

The polarity directions of first and second sub-windings 36, 39 are reverse. FIG. 5 illustrates the case where the polarity directions of first and second sub-windings 36, 39 are the upward direction and the downward direction, respectively. The number of turns of first and second sub-windings 36, 39 are the same.

The polarities of three first sub-windings 34 to 36 are oriented upward. Three first sub-windings 34 to 36 are connected in series between first and second main terminals 25a, 25b of insulating transformer 25 to configure a first main winding 26. In addition, the polarities of three second sub-windings 37 to 39 are directed downward. Three second sub-windings 37 to 39 are connected in series between third and fourth main terminals 25c, 25d of insulating transformer 25 to configure a second main winding 27.

When AC voltage VAC1 is applied between first main terminal 25a and second main terminal 25b, AC voltage VAC2 appears between third main terminal 25c and fourth main terminal 25d. When AC voltage VAC2 is applied between third main terminal 25c and fourth main terminal 25d, AC voltage VAC1 appears between first main terminal 25a and second main terminal 25b. Because the number of turns of first main winding 26 and the number of turns of second main winding 27 are the same, the amplitude of AC voltage VAC1 and the amplitude of AC voltage VAC2 are the same. Because the polarity direction of first main winding 26 and the polarity direction of second main winding 27 are reverse, AC voltages VAC1, VAC2 have opposite polarities, and the phase of AC voltage VAC1 and the phase of AC voltage VAC2 are shifted by 180 degrees.

Each of sub-terminals 31b, 32a and sub-terminals 31d, 32c to which sub-insulating transformers 31, 32 are connected is a high-impedance connection point to which an electrical component other than sub-insulating transformers 31, 32 is not connected. Each of sub-terminals 32b, 33a and sub-terminals 32d, 33c to which sub-insulating transformers 32, 33 are connected is a high-impedance connection point to which an electrical component other than sub-insulating transformers 32, 33 is not connected. For this reason, unlike a low-impedance connection point to which a low-impedance component such as a voltage source and a capacitor is connected, the interphase capacitance between the first and second sub-windings of sub-insulating transformer 31 to 33 becomes apparent at the connection point of insulating transformer 31 to 33, and the resonance phenomenon is generated in a path passing through the first and second sub-windings and the interphase capacitance therebetween.

Figure 6:
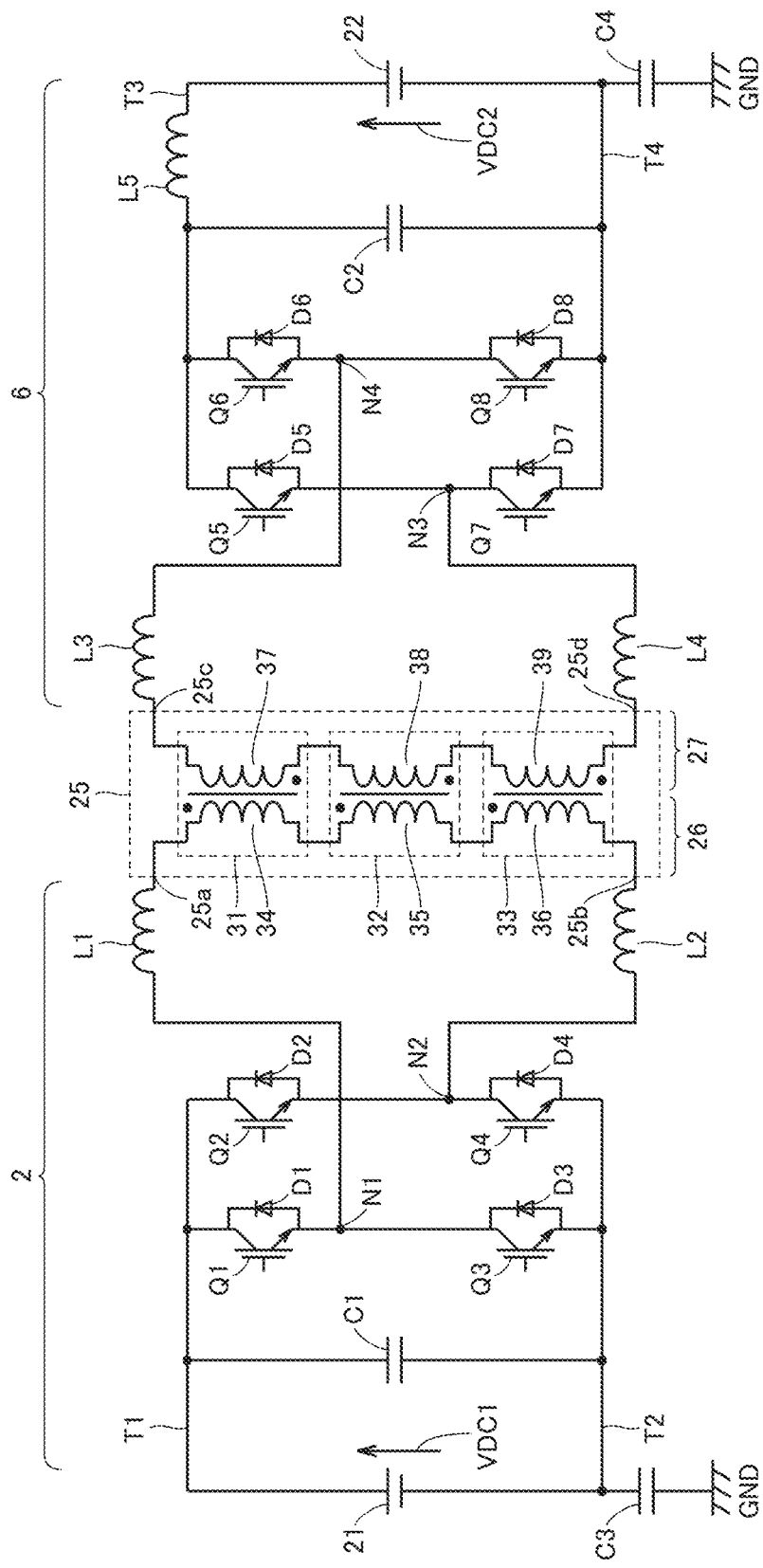
FIG. 6 is a circuit diagram illustrating a configuration of the bidirectional DC/DC converter including an insulating transformer in FIG. 5.

FIG. 6 is the circuit diagram illustrating a configuration of the bidirectional DC/DC converter including insulating transformer 25 in FIG. 5, and is a view compared with FIG. 3. In FIG. 6, first to fourth main terminals 25a to 25d of insulating transformer 25 are connected to one terminals of reactors L1 to L4, and the other terminals of reactors L1 to L4 are connected to nodes N1 to N4. In addition, an earth capacitance C3 is connected between DC terminal T2 and a line (a line of the reference voltage) of a ground voltage GND, and an earth capacitance C4 is connected between DC terminal T4 and the line of ground voltage GND.

Earth capacitances C3, C4 assume the case where each of DC terminals T2, T4 is connected to a grounded housing with a capacitor interposed therebetween. However, this represents the state in which DC terminals T2, T4 are coupled to each other through an electrically low-impedance path. Each of DC terminals T2, T4 may be directly connected to the housing without interposing the capacitor therebetween, and the housing may be grounded. In addition, each of DC terminals T2, T4 may be connected to a power system in which a ground potential is defined with an inverter circuit interposed therebetween.

For example, when IGBT Q3 is turned on to vary the voltage at node N1, excitation inductance of sub-windings 34, 37 of sub-insulating transformer 31 is excited in the current path from node N1 to node N1 through reactor L1, first sub-winding 34 of sub-insulating transformer 31, an interphase capacitance C5 between sub-windings 34, 37, second sub-winding 37, reactor L3, IGBT Q7, earth capacitance C4, the line of ground voltage GND, earth capacitance C3, and diode D3.

Figure 7:
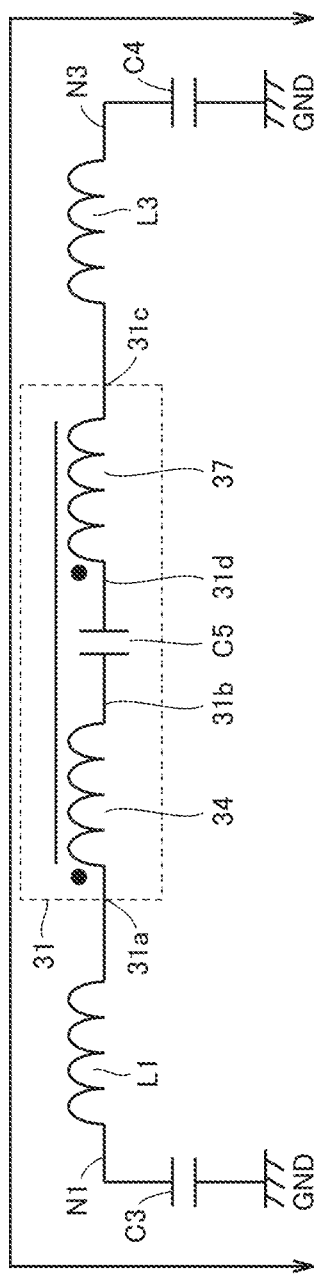
FIG. 7 is a circuit diagram illustrating a resonance phenomenon generated in the bidirectional DC/DC converter in FIG. 6.

As a result, as illustrated in FIG. 7, interphase capacitance C5 is connected between second and fourth sub-terminals 31b, 31d of sub-insulating transformer 31, first sub-terminal 31a is connected to the line of ground voltage GND through reactor L1, node N1, and earth capacitance C3, and third sub-terminal 31c is connected to the line of ground voltage GND through reactor L3, node N3, and earth capacitance C4 to form a resonance circuit, and the resonance phenomenon is generated among the excitation inductance of the first sub-winding 34, interphase capacitance C5, and the excitation inductance of second sub-winding 37.

Figure 8:
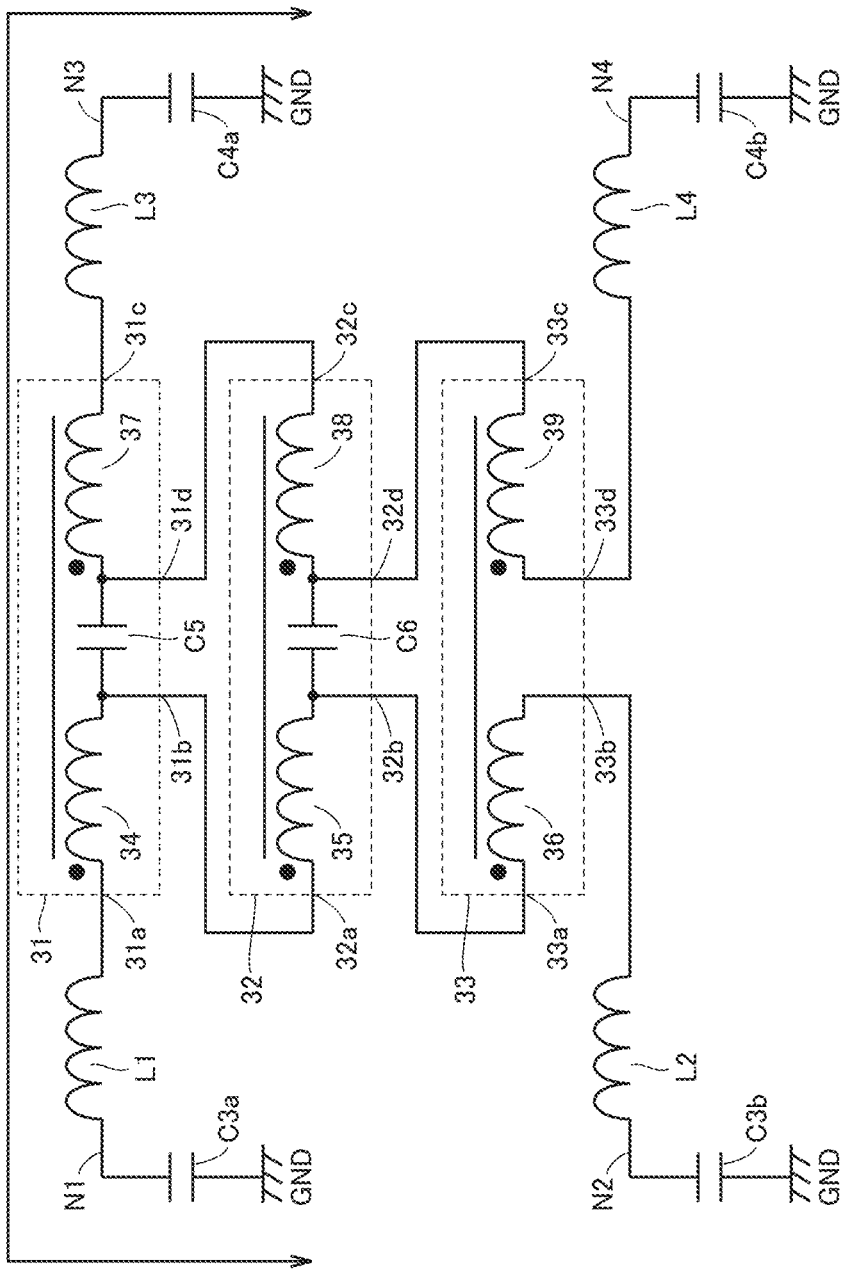
FIG. 8 is another circuit diagram illustrating the resonance phenomenon generated in the bidirectional DC/DC converter in FIG. 6.

The equivalent circuit in FIG. 7 is simplified for simplification of description, and the resonance circuit is not independent of sub-insulating transformer 31 alone. However, a resonance circuit in FIG. 8 is actually configured. That is, in FIG. 8, nodes N1 to N4 are connected to the line of ground voltage GND through earth capacitances C3a, C3b, C4a, C4b. An interphase capacitance C6 is connected between second and fourth sub-terminals 32b, 32d of second sub-insulating transformer 32.

Second sub-terminal 31b of first sub-insulating transformer 31 is connected to the line of ground voltage GND through sub-windings 35, 36, reactor L2, and earth capacitance C3b. Fourth sub-terminal 31d of first sub-insulating transformer 31 is connected to the line of ground voltage GND through sub-windings 38, 39, reactor L4, and earth capacitance C4b. The resonance phenomenon is generated between the excitation inductance of first sub-winding 34 to 36, interphase capacitances C5, C6, and the excitation inductance of second sub-winding 37 to 39.

In such a resonance phenomenon, the excitation inductance of sub-winding 34 to 39 of sub-insulating transformer 31 to 33 becomes usually the value greater than or equal to several hundred times compared with the inductance value or the like of reactors L1 to L4 maintaining a DC superimposition characteristic. For this reason, even when the current flowing due to the resonance phenomenon is minute with respect to the main current of the circuit, voltage vibration that cannot be ignored is generated, and a loss of sub-insulating transformer 31 to 33 is also adversely affected. In the resonance circuit of FIG. 7, the excitation inductance of first sub-winding 34 and the excitation inductance of second sub-winding 37 have the same polarity, the sum of the excitation inductances of first and second sub-windings 34, 37 becomes a large value, and the large voltage vibration is generated. Assuming that sub-windings 34, 37 constitute one winding, because the inductance of the winding is proportional to the square of the number of turns, the excitation inductance of sub-windings 34, 37 becomes four times the excitation inductance of each of sub-windings 34, 37.

Figure 9:
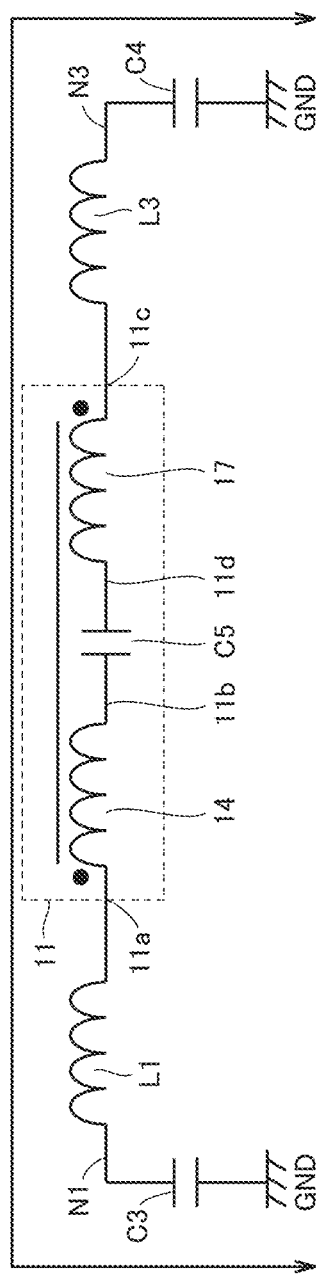
FIG. 9 is a view illustrating an advantageous effect of the first embodiment.

FIG. 9 is a circuit diagram illustrating the configuration of the resonance circuit generated in the bidirectional DC/DC converter of FIG. 3, and is a view compared with FIG. 7. In FIG. 9, interphase capacitance C5 is connected between second and fourth sub-terminals 11b, 11d of sub-insulating transformer 11, first sub-terminal 11a is connected to the line of ground voltage GND through reactor L1, node N1, and earth capacitance C3, and third sub-terminal 11c is connected to the line of ground voltage GND through reactor L3, node N3, and earth capacitance C4 to constitute the resonance circuit.

In this resonance circuit, the excitation inductance of first sub-winding 14 and the excitation inductance of second sub-winding 17 have opposite polarities to cancel each other, and the sum of the excitation inductances of the first sub-windings 14, 17 becomes zero, so that the resonance phenomenon is not generated.

In the first embodiment, when the number of turns of first sub-winding 14 is the same as the number of turns of second sub-winding 17, the sum of the excitation inductances of first sub-windings 14, 17 is set to zero, and the generation of the resonance phenomenon can be most effectively prevented. However, even when the number of turns of first sub-winding 14 is different from the number of turns of second sub-winding 17, the sum of the excitation inductances of the first sub-windings 14, 17 can be reduced to prevent the generation of the resonance phenomenon.

Figure 10:
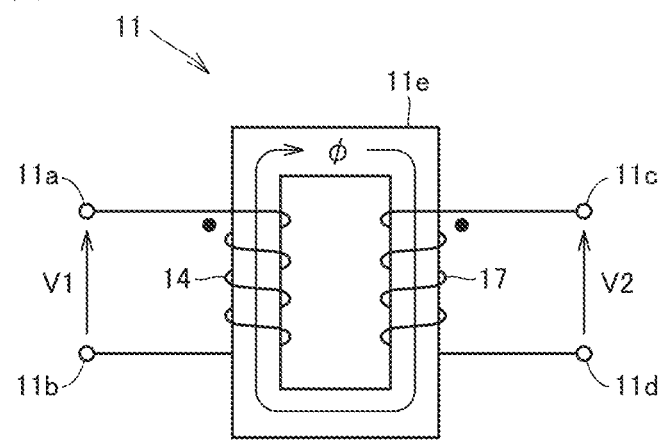
FIG. 10 is another circuit diagram illustrating the advantageous effect of the first embodiment.
Figure 10:
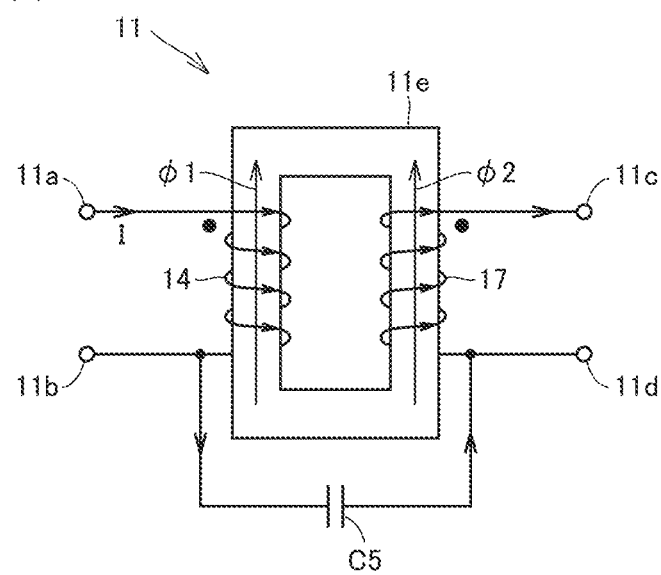

FIG. 10 is a view illustrating the configuration and operation of sub-insulating transformer 11. FIG. 10(A) illustrates the normal transformation operation, and FIG. 10(B) illustrates the operation when the current flows through interphase capacitance C5.

In FIG. 10(A), each of sub-windings 14, 17 is wound around an annular iron core 11e. Sub-windings 14, 17 share a magnetic flux $\varphi$ passing through iron core 11e. When the numbers of turns of sub-windings 14, 17 are denoted by n1, n2, and when the voltages between the terminals of sub-windings 14, 17 are denoted by V1, V2, V1=n1(d$\varphi$/dt) and V2=n2(d$\varphi$/dt) hold. Where, n1=n2. V1 and V2 have the same polarity, and have the same phase and the same amplitude.

In FIG. 10(B), when a current I flows from first sub-terminal 11a to third sub-terminal 11c through first sub-winding 14, interphase capacitance C5, and second sub-winding 17, a magnetic flux $\varphi$1 is generated in iron core 11e by current I flowing through first sub-winding 14, and a magnetic flux $\varphi$2 is generated in iron core 11e by current I flowing through second sub-winding 17. In iron core 11e, magnetic flux $\varphi$1 and magnetic flux @2 are generated in opposite directions, and magnetic flux $\varphi$1 and magnetic flux @2 cancel each other.

At this point, assuming that the excitation inductances of first and second sub-windings 14, 17 when current I flows are La, Lb, $\varphi$1=La×I, $\varphi$2=Lb×I are obtained, and thus $\varphi$1+$\varphi$2=(La+Lb)I=0 is obtained. Accordingly, the excitation inductances La, Lb of first and second sub-windings 14, 17 have opposite polarities to cancel each other.

As described above, in the first embodiment, insulating transformer 3 is configured by connecting the plurality of sub-insulating transformers 11 to 13 in series, so that the increase in volume and the weight concentration can be prevented in insulating transformer 3, the assemblability can be improved by enabling the substrate mounting, the heat dissipation can be improved by dispersing the heat source, and the cost reduction can be implemented using the general-purpose sub-insulating transformer with the large distribution amount and easy availability.

In addition, because the polarity directions of sub-windings 14 to 19 of sub-insulating transformer 11 to 13 are the same, for example, when current I flows from first main terminal 3a to third main terminal 3b through first sub-winding 14, interphase capacitance C5, and second sub-winding 17, the sum of the excitation inductances La, Lb of first and second sub-windings 14, 17 becomes zero. Accordingly, the generation of the resonance phenomenon can be prevented.

In the first embodiment, the case where insulating transformer 3 is provided in the bidirectional DC/DC converter of the DAB system has been described, however, the present invention is not limited thereto. It goes without saying that the same effect can be obtained even when insulating transformer 3 is provided in another high frequency circuit.

In the first embodiment, the DAB-system bidirectional DC/DC converter including insulating transformer 3 including two main windings 4, 5 and two bridge circuits (Q1 to Q4 and Q5 to Q8) has been described. However, the present invention is not limited to this. For example, in a triple active bridge (TAB)-system DC/DC converter that includes an insulating transformer including three main windings, three bridge circuits connected to the three main windings, and three DC terminal pairs connected to the three bridge circuits and performs power transmission between each DC terminal pair and another DC terminal pair, the insulating transformer may be divided into a plurality of sub-insulating transformers, and the polarity directions of all the sub-windings may be aligned. Also in this case, the generation of the resonance phenomenon in each sub-insulating transformer can be prevented.

Second Embodiment

Figure 11:
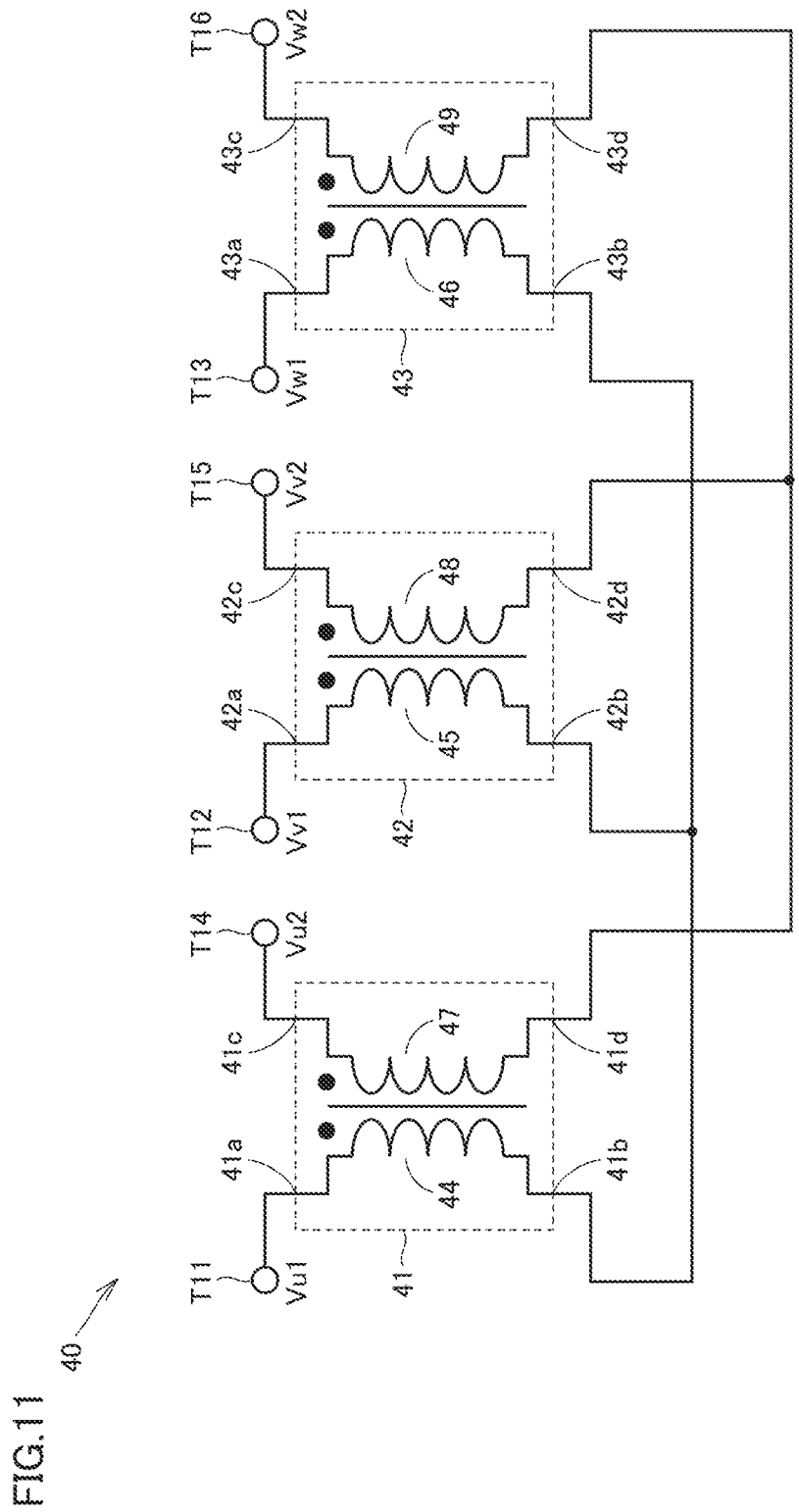
FIG. 11 is a view illustrating a configuration of an insulating transformer according to a second embodiment.

FIG. 11 is a circuit diagram illustrating a configuration of an insulating transformer 40 according to a second embodiment. In FIG. 11, insulating transformer 40 is a three-phase transformer having a Y-Y connection, and includes first to sixth main terminals T11 to T16 and first to third sub-insulating transformers 41 to 43. First to third main terminals T11 to T13 receive three-phase AC voltages Vu1, Vv1, Vw1. Three-phase AC voltages Vu2, Vv2, Vw2 are output to fourth to sixth main terminals T14 to T16.

First sub-insulating transformer 41 includes an iron core (not illustrated), first and second sub-windings 44, 47 wound around the iron core, and first to fourth sub-terminals 41a to 41d. A black circle (•) is marked on the positive polarity side of each of first and second sub-windings 44, 47. The positive electrode terminal and the negative electrode terminal of first sub-winding 44 are connected to first and second sub-terminals 41a, 41b, respectively. The positive electrode terminal and the negative electrode terminal of second sub-winding 47 are connected to third and fourth sub-terminals 41c, 41d, respectively.

The polarity directions of first and second sub-windings 44, 47 are the same. FIG. 11 illustrates the case where both the polarity directions of first and second sub-windings 44, 47 are the upward direction. The numbers of turns of first and second sub-windings 44, 47 are the same.

The second sub-insulating transformer 42 includes an iron core (not illustrated), first and second sub-windings 45, 48 wound around the iron core, and first to fourth sub-terminals 42a to 42d. A black circle (•) is marked on the positive polarity side of each of first and second sub-windings 45, 48. The positive electrode terminal and the negative electrode terminal of first sub-winding 45 are connected to first and second sub-terminals 42a, 42b, respectively. The positive electrode terminal and the negative electrode terminal of second sub-winding 48 are connected to third and fourth sub-terminals 42c, 42d, respectively.

The polarity directions of first and second sub-windings 45, 48 are the same. FIG. 11 illustrates the case where both the polarity directions of first and second sub-windings 45, 48 are the upward direction. The numbers of turns of first and second sub-windings 45, 48 are the same.

Third sub-insulating transformer 43 includes an iron core (not illustrated), first and second sub-windings 46, 49 wound around the iron core, and first to fourth sub-terminals 43a to 43d. A black circle (•) is marked on the positive polarity side of each of first and second sub-windings 46, 49. The positive electrode terminal and the negative electrode terminal of first sub-winding 46 are connected to first and second sub-terminals 43a, 43b, respectively. The positive electrode terminal and the negative electrode terminal of second sub-winding 49 are connected to third and fourth sub-terminals 43c, 43d, respectively.

The polarity directions of first and second sub-windings 46, 49 are the same. FIG. 11 illustrates the case where both the polarity directions of first and second sub-windings 46, 49 are the upward direction. The numbers of turns of first and second sub-windings 46, 49 are the same.

First sub-terminals 41a, 42a, 43a of sub-insulating transformers 41, 42, 43 are connected to first to third main terminals T11 to T13, respectively. Third sub-terminals 41c, 42c, 43c of sub-insulating transformers 41, 42, 43 are connected to fourth to sixth main terminals T14 to T16, respectively. Second sub-terminals 41b, 42b, 43b of sub-insulating transformers 41, 42, 43 are connected to each other. Fourth sub-terminals 41d, 42d, 43d of sub-insulating transformers 41, 42, 43 are connected to each other.

When three-phase AC voltages Vu1, Vv1, Vw1 are respectively applied to first to third main terminals T11 to T13, three-phase AC voltages Vu2, Vv2, Vw2 appear on fourth to sixth main terminals T14 to T16, respectively. When three-phase AC voltages Vu2, Vv2, Vw2 are respectively applied to fourth to sixth main terminals T14 to T16, three-phase AC voltages Vu1, Vv1, Vw1 appear on first to third main terminals T11 to T13, respectively.

Because the numbers of turns of first main windings 44, 45, 46 and the numbers of turns of second main windings 47, 48, 49 are the same, the amplitudes of AC voltages Vu1, Vv1, Vw1 and the amplitudes of AC voltages Vu2, Vv2, Vw2 are the same. Because the polarity directions of first main windings 44, 45, 46 and the polarity directions of second main windings 47, 48, 49 are the same, AC voltages Vu1, Vv1, Vw1 and AC voltages Vu2, Vv2, Vw2 have the same polarity, respectively, and the phases of AC voltages Vu1, Vv1, Vw1 and the phases of AC voltages Vu2, Vv2, Vw2 are the same, respectively.

Even when the current flows from first main terminal T11 to fourth main terminal T14 through first sub-winding 44, the interphase capacitance between sub-windings 44, 47, and second sub-winding 47 for some reason, a sum of the excitation inductances of sub-windings 44, 47 becomes zero as described with reference to FIG. 9, so that the generation of the resonance phenomenon in sub-insulating transformer 41 can be prevented. Similarly, the generation of the resonance phenomenon in each of sub-insulating transformers 42, 43 can also be prevented.

Even in the second embodiment, the effect similar to that of the first embodiment can be obtained.

Third Embodiment

Figure 12:
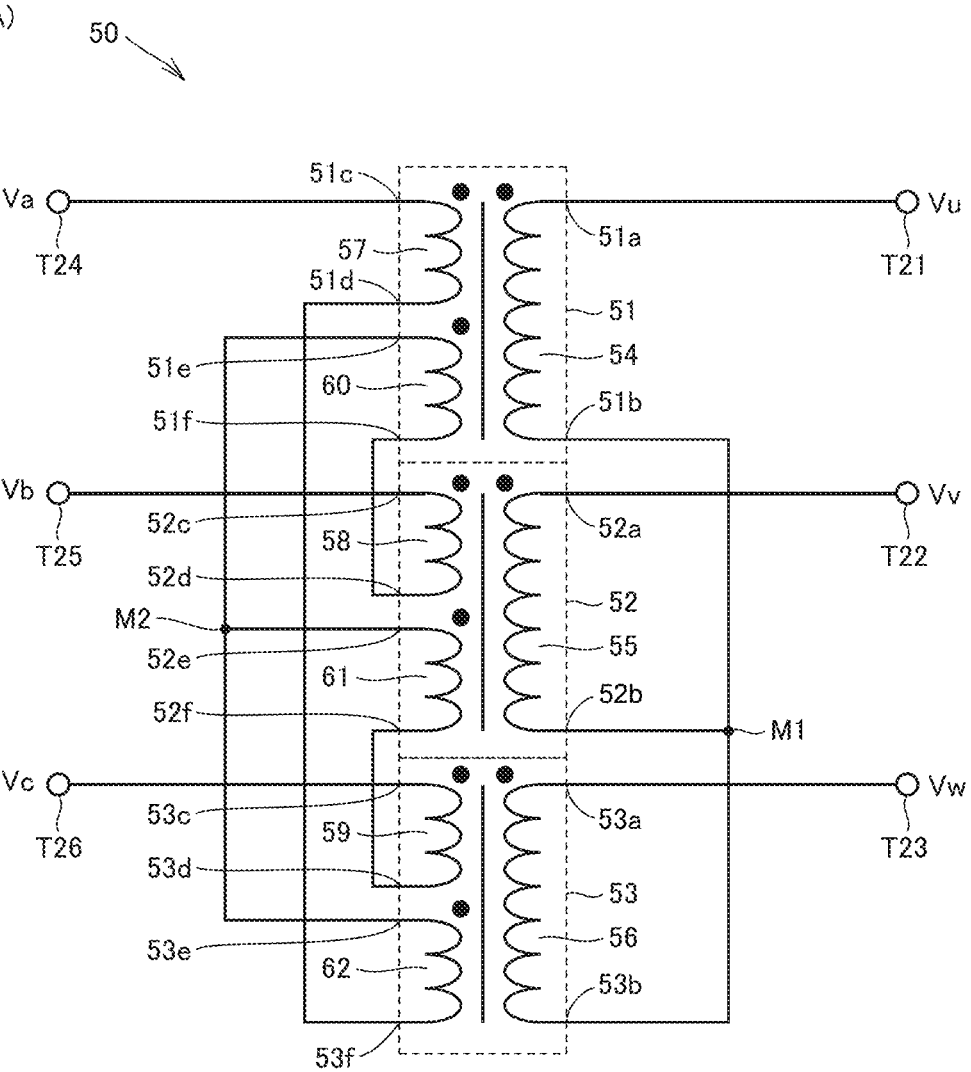
FIG. 12 is a view illustrating an insulating transformer according to a third embodiment.
Figure 12:
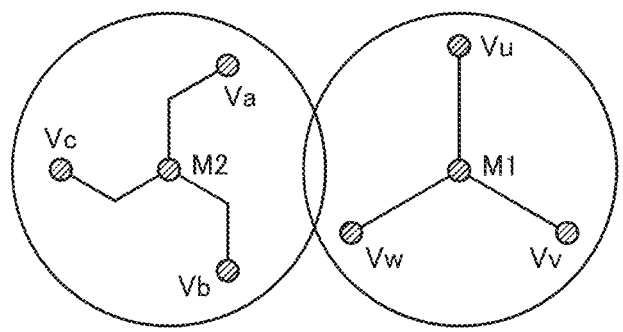

FIG. 12 is a view illustrating an insulating transformer 50 according to a third embodiment. FIG. 12(A) illustrates the configuration of insulating transformer 50, and FIG. 12(B) illustrates the operation of insulating transformer 50. Insulating transformer 50 is a three-phase transformer having a Y-zigzag connection, and includes first to sixth main terminals T21 to T26 and first to third sub-insulating transformers 51 to 53. First to third main terminals T21 to T23 receive three-phase AC voltages Vu, Vv, Vw. Three-phase AC voltages Va, Vb, Vc are output to fourth to sixth main terminals T24 to T26.

First sub-insulating transformer 51 includes an iron core (not illustrated), first to third sub-windings 54, 57, 60 wound around the iron core, and first to sixth sub-terminals 51a to 51f. A black circle (•) is printed on the positive polarity side of each of first to third sub-windings 54, 57, 60. The positive electrode terminal and the negative electrode terminal of first sub-winding 54 are connected to first and second sub-terminals 51a, 51b, respectively. The positive electrode terminal and the negative electrode terminal of second sub-winding 57 are connected to third and fourth sub-terminals 51c, 51d, respectively. The positive electrode terminal and the negative electrode terminal of third sub-winding 60 are connected to fifth and sixth sub-terminals 51e, 51f, respectively.

The polarity directions of first to third sub-windings 54, 57, 60 are the same. FIG. 12(A) illustrates the case where all the polarity directions of first to third sub-windings 54, 57, 60 are the upward direction. A ratio of the numbers of turns of first to third sub-windings 54, 57, 60 is 2:1:1.

Second sub-insulating transformer 52 includes an iron core (not illustrated), first to third sub-windings 55, 58, 61 wound around the iron core, and first to sixth sub-terminals 52a to 52f. A black circle (•) is printed on the positive polarity side of each of first to third sub-windings 55, 58, 61. The positive electrode terminal and the negative electrode terminal of first sub-winding 55 are connected to first and second sub-terminals 52a, 52b, respectively. The positive electrode terminal and the negative electrode terminal of second sub-winding 58 are connected to third and fourth sub-terminals 52c, 52d, respectively. The positive electrode terminal and the negative electrode terminal of third sub-winding 61 are connected to fifth and sixth sub-terminals 52e, 52f, respectively.

The polarity directions of first to third sub-windings 55, 58, 61 are the same. FIG. 12(A) illustrates the case where all the polarity directions of first to third sub-windings 55, 58, 61 are the upward direction. The ratio of the numbers of turns of first to third sub-windings 55, 58, 61 is 2:1:1.

Third sub-insulating transformer 53 includes an iron core (not illustrated), first to third sub-windings 56, 59, 62 wound around the iron core, and first to sixth sub-terminals 53a to 53f. A black circle (•) is printed on the positive polarity side of each of first to third sub-windings 56, 59, 62. The positive electrode terminal and the negative electrode terminal of first sub-winding 56 are connected to first and second sub-terminals 53a, 53b, respectively. The positive electrode terminal and the negative electrode terminal of second sub-winding 59 are connected to third and fourth sub-terminals 53c, 53d, respectively. The positive electrode terminal and the negative electrode terminal of third sub-winding 62 are connected to fifth and sixth sub-terminals 53e, 53f, respectively.

The polarity directions of first to third sub-windings 56, 59, 62 are the same. FIG. 12(A) illustrates the case where all the polarity directions of first to third sub-windings 56, 59, 62 are the upward direction. The ratio of the numbers of turns of first to third sub-windings 56, 59, 62 is 2:1:1.

First sub-terminals 51a, 52a, 53a of sub-insulating transformers 51, 52, 53 are connected to first to third main terminals T21 to T23, respectively. Third sub-terminals 51c, 52c, 53c of sub-insulating transformers 51, 52, 53 are connected to fourth to sixth main terminals T24 to T26, respectively. Second sub-terminals 51b, 52b, 53b of sub-insulating transformers 51, 52, 53 are connected to a first neutral point M1. Fifth sub-terminals 51e, 52e, 53e of sub-insulating transformers 51, 52, 53 are connected to a second neutral point M2. Sixth sub-terminals 51f, 52f, 53f of sub-insulating transformers 51, 52, 53 are connected to fourth sub-terminals 52d, 53d, 51d of sub-insulating transformers 52, 53, 51, respectively.

When three-phase AC voltages Vu, Vv, Vw are applied to first to third main terminals T21 to T23, respectively, the voltages between the terminals of second sub-windings 57, 58, 59 become Vu/2, Vv/2, Vw/2, respectively, and the voltages between the terminals of third sub-windings 60, 61, 62 become Vu/2, Vv/2, Vw/2, respectively. AC voltages Va, Vb, Vc appear at fourth to sixth main terminals T24, T25, T26, respectively. Va=Vu/2−Vw/2, Vb=Vv/2−Vu/2, Vc=Vw/2−Vv/2 are obtained.

As illustrated in FIG. 12(B), the phases of three-phase AC voltages Vu, Vv, Vw are shifted by 120 degrees, and the phases of three-phase AC voltages Va, Vb, Vc are also shifted by 120 degrees. The phases of three-phase AC voltages Va, Vb, Vc are advanced by 30 degrees from the phases of three-phase AC voltages Vu, Vv, Vw, respectively.

Even when the current flows from first main terminal T21 to fourth main terminal T24 through the interphase capacitance between first sub-winding 51 and sub-windings 54, 60, the interphase capacitance between third sub-winding 60 and sub-windings 60, 57, and second sub-winding 57 for some reason, the sum of the excitation inductances of sub-windings 51, 60, 57 becomes zero as described with reference to FIG. 9, so that the generation of the resonance phenomenon can be prevented in sub-insulating transformer 51. Similarly, the generation of the resonance phenomenon can be prevented in each of sub-insulating transformers 52, 53.

Even in the third embodiment, the effect similar to that of the first embodiment can be obtained.

Figure 13:
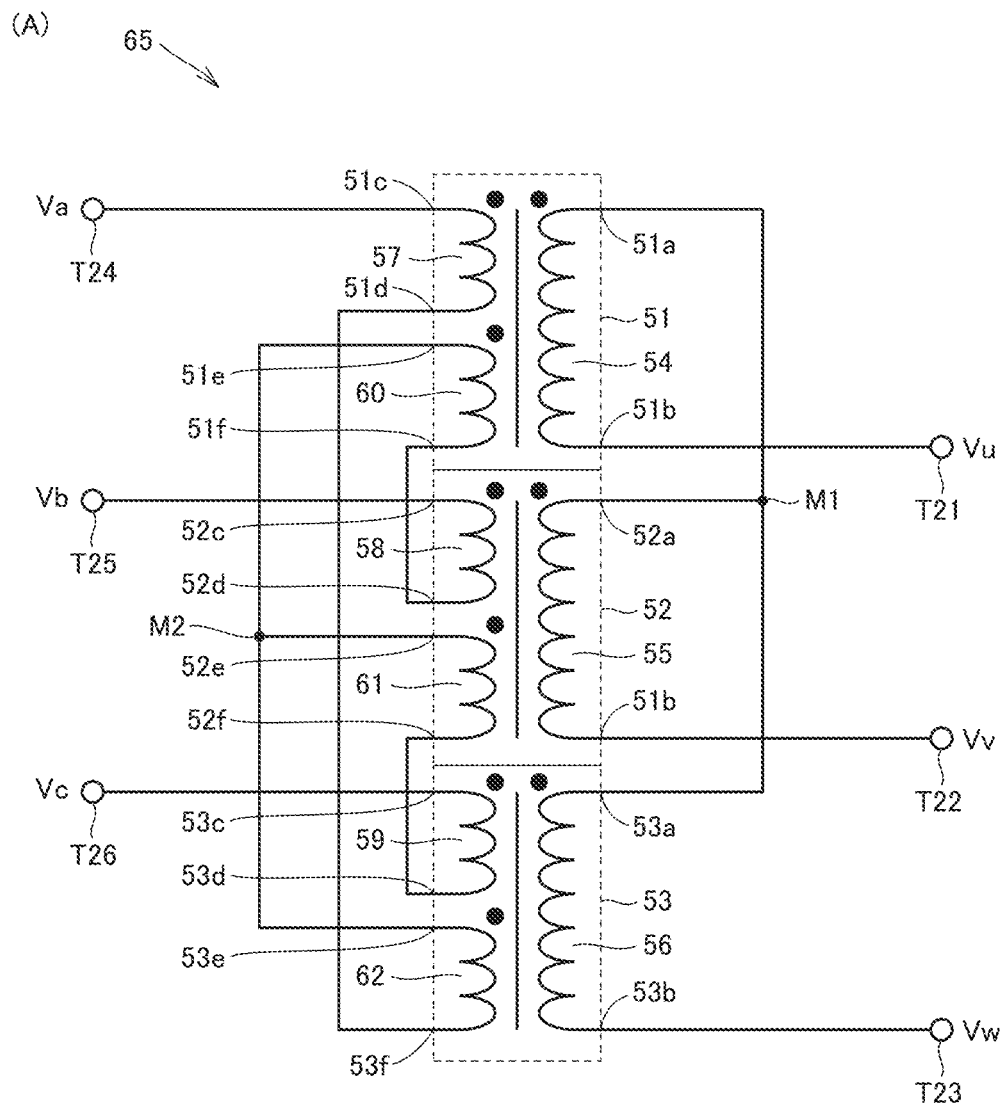
FIG. 13 is a view illustrating a comparative example of the third embodiment.
Figure 13:
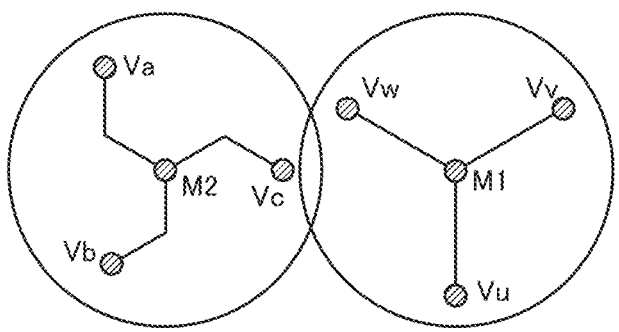

FIG. 13 is a view illustrating an insulating transformer 65 according to a comparative example of the third exemplary embodiment, and is a view compared with FIG. 12. FIG. 13(A) illustrates the configuration of insulating transformer 65, and FIG. 13(B) illustrates the operation of insulating transformer 65.

Insulating transformer 65 is different from insulating transformer 50 of FIG. 12 in that first sub-terminals 51a, 52a, 53a of sub-insulating transformers 51, 52, 53 are connected to first neutral point M1, and second sub-terminals 51b, 52b, 53b of sub-insulating transformers 51, 52, 53 are connected to first to third main terminals T21, T22, T23.

When three-phase AC voltages Vu, Vv, Vw are applied to first to third main terminals T21 to T23, respectively, the inter-terminal voltages of second sub-windings 57, 58, 59 become −Vu/2, −Vv/2, −Vw/2, respectively, and the inter-terminal voltages of third sub-windings 60, 61, 62 become −Vu/2, −Vv/2, −Vw/2, respectively. AC voltages Va, Vb, Vc appear at fourth to sixth main terminals T24, T25, T26, respectively. Va=−Vu/2+Vw/2, Vb=−Vv/2+Vu/2, Vc=−Vw/2+Vv/2 are obtained.

As illustrated in FIG. 13(B), the phases of three-phase AC voltages Vw, Vv, Vu are shifted by 120 degrees, and the phases of three-phase AC voltages Vc, Vb, Va are also shifted by 120 degrees. The phases of three-phase AC voltages Vb, Vc, Va are delayed by 30 degrees from the phases of three-phase AC voltages Vu, Vv, Vw, respectively.

For example, when the current flows from first main terminal T21 to fourth main terminal T24 through the interphase capacitance between sub-windings 54, 60, the interphase capacitance between sub-winding 60 and sub-windings 60, 57, and sub-winding 57, the excitation inductances of sub-windings 60, 57 have the same polarity, and the sum of the excitation inductances of sub-windings 60, 57 has the large value. For this reason, the resonance phenomenon is generated among the interphase capacitance between sub-windings 54, 60, the excitation inductance of sub-winding 60, the interphase capacitance between sub-windings 60, 57, and the excitation inductance of sub-winding 57, and the large voltage vibration is generated. Accordingly, in insulating transformer 65 of the comparative example, the generation of the resonance phenomenon cannot be prevented.

Fourth Embodiment

Figure 14:
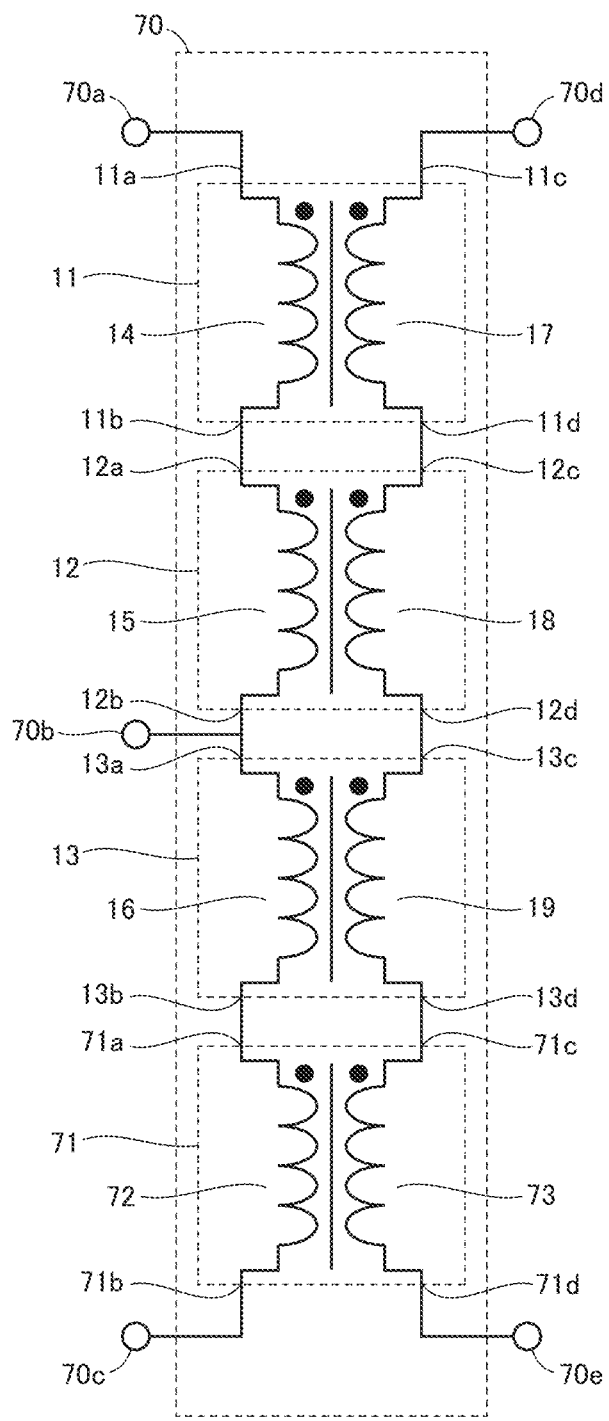
FIG. 14 is a circuit diagram illustrating a configuration of an insulating transformer according to a fourth embodiment.

FIG. 14 is a circuit diagram illustrating a configuration of an insulating transformer 70 according to the fourth embodiment, and is a view compared with FIG. 2. Insulating transformer 70 is different from insulating transformer 3 of FIG. 2 in that first to fourth main terminals 3a to 3d are replaced with first to fifth main terminals 70a to 70e, and that a fourth sub-insulating transformer 71 is added.

Fourth sub-insulating transformer 71 includes an iron core (not illustrated), first and second sub-windings 72, 73 wound around the iron core, and first to fourth sub-terminals 71a to 71d. A black circle (•) is marked on the positive polarity side of each of first and second sub-windings 72, 73. The positive electrode terminal and the negative electrode terminal of first sub-winding 72 are connected to first and second sub-terminals 71a, 71b, respectively. The positive electrode terminal and the negative electrode terminal of second sub-winding 73 are connected to third and fourth sub-terminals 71c, 71d, respectively.

The polarity directions of first and second sub-windings 72, 73 are the same. FIG. 14 illustrates the case where the polarity direction of first and second sub-windings 72, 73 is the upward direction. The numbers of turns of first and second sub-windings 72, 73 are the same.

First and third sub-terminals 71a, 71c of fourth sub-insulating transformer 71 are connected to second and fourth sub-terminals 13c, 13d of third sub-insulating transformer 13, respectively. Second and fourth sub-terminals 71b, 71d of fourth sub-insulating transformer 71 are connected to third and fifth main terminals 70c, 70e, respectively. First and third sub-terminals 11a, 11c of first sub-insulating transformer 11 are connected to first and fourth main terminals 70a, 70d, respectively. Second main terminal 70b is connected to second sub-terminal 12b of second sub-insulating transformer 12.

The polarities of eight sub-windings 11 to 13, 17 to 19, 72, 73 are oriented in the same direction. Sub-windings 11, 12 configure the first main winding, sub-windings 13, 72 configure the second main winding, and sub-windings 17 to 19, 73 configure the third main winding. The polarities of the first to third main windings are oriented in the same direction.

When an AC voltage V1 is applied between first and second main terminals 70a, 70b and when an AC voltage V2 is applied between second and third main terminals 70b, 70c, an AC voltage V3 appears between fourth and fifth main terminals 70d, 70e. When AC voltages V1, V2 have the same polarity and the same amplitude, AC voltages V1, V2, V3 have the same polarity, the phases of AC voltages V1, V2, V3 are the same, and the ratio of the amplitudes of the AC voltages V1, V2, V3 becomes 1:1:2.

Even when the current flows from first main terminal 70a to fourth main terminal 70d through the interphase capacitance between first sub-winding 14 and sub-windings 14, 17 and second sub-winding 17 for some reason, the sum of the excitation inductances of sub-windings 14, 17 becomes zero as described with reference to FIG. 9, so that the generation of the resonance phenomenon in sub-insulating transformer 11 can be prevented. Similarly, the generation of the resonance phenomenon can be prevented in each of sub-insulating transformers 12, 13, 71.

Even in the fourth embodiment, the effect similar to that of the first embodiment can be obtained.

It goes without saying that the first to fourth embodiments may be appropriately combined. For example, the same effect can be obtained by replacing each of sub-insulating transformers 41 to 43 in FIG. 11 with insulating transformer 3 in FIG. 2.

It should be considered that the disclosed embodiment is an example in all respects and not restrictive. The present invention is defined by not the description above, but the claims, and it is intended that all modifications within the meaning and scope of the claims are included in the present invention.

REFERENCE SIGNS LIST

T1 to T4: DC terminal, 1, 7: current detector, 2, 6: power converter, 3, 25, 40, 50, 65, 70: insulating transformer, 4, 5, 26, 27: main winding, 8: operation unit, 9: control device, 9a: processing device, 11 to 13, 31 to 33, 41 to 43, 51 to 53, 71: sub-insulating transformer, 11e: iron core, 14 to 19, 34 to 39, 44 to 49, 54 to 62, 72, 73: sub-winding, 21, 22: DC power supply, C1, C2: capacitor, Q1 to Q8: IGBT, D1 to D8: diode, L1 to L5: reactor, C3, C3a, C3b, C4, C4a, C4b: earth capacitance, C5, C6: interphase capacitance

The invention claimed is:

1. An insulating transformer comprising:
first to Nth sub-insulating transformers electrically coupled to each other, N being an integer greater than or equal to 2, wherein each of the first to Nth sub-insulating transformers includes:
first and second sub-windings;
first and second sub-terminals connected to a first polarity terminal and a second polarity terminal of the first sub-winding, respectively; and
third and fourth sub-terminals connected to a first polarity terminal and a second polarity terminal of the second sub-winding, respectively,
polarity directions of the first and second sub-windings are identical,
the first sub-winding of each of the first to Nth sub-insulating transformers and the second sub-windings of each of the first to Nth sub-insulating transformers are electrically insulated from each other except for an interphase capacitance,
each of the first to Nth sub-insulating transformers is configured such that an excitation inductance of the first sub-winding and an excitation inductance of the second sub-winding become opposite polarities when a current flows from the first sub-terminal to the third sub-terminal through the first sub-winding, the interphase capacitance between the first and second sub-windings, and the second sub-winding,
each of the first to Nth sub-insulating transformers includes an iron core, the first and second sub-windings of each of the first to Nth sub-insulating transformers are being wound around the respective iron core, and
the iron core of each of the first to the Nth sub-insulating transformers are separated from each other,
wherein
the insulating transformer comprises:
first and second main windings;
first and second main terminals connected to a first polarity terminal and a second polarity terminal of the first main winding, respectively; and
third and fourth main terminals connected to a first polarity terminal and a second polarity terminal of the second main winding, respectively,
polarity directions of the first and second main windings are identical,
the polarity directions of the N first sub-windings included in the first to Nth sub-insulating transformers are identical, and the N first sub-windings are connected in series between the first and second main terminals to configure the first main winding, and
the polarity directions of the N second sub-windings included in the first to Nth sub-insulating transformers are identical, and the N second sub-windings are connected in series between the third and fourth main terminals to configure the second main winding.

2. The insulating transformer according to claim 1, wherein a number of turns of the first sub-winding of each of the first to Nth sub-insulating transformers is identical to a number of turns in the corresponding second sub-winding of the first to Nth sub-insulating transformers.

* * * * *